(12) United States Patent
Naqvi

(10) Patent No.: US 9,232,046 B2
(45) Date of Patent: Jan. 5, 2016

(54) SYSTEM AND METHOD FOR CONTROLLING MOBILE SERVICES USING SENSOR INFORMATION

(75) Inventor: Shamim A. Naqvi, Morristown, NJ (US)

(73) Assignee: TKSN HOLDINGS, LLC, Park Ridge, IL (US)

( * ) Notice: Subject to any disclaimer, the term of this patent is extended or adjusted under 35 U.S.C. 154(b) by 0 days.

(21) Appl. No.: 13/507,077

(22) Filed: Jun. 1, 2012

(65) Prior Publication Data

US 2014/0370869 A1    Dec. 18, 2014

Related U.S. Application Data

(63) Continuation-in-part of application No. 12/804,448, filed on Jul. 21, 2010, now Pat. No. 9,210,528, and a continuation-in-part of application No. 12/921,153, filed on Jan. 25, 2011.

(51) Int. Cl.
| | |
|---|---|
| *H04M 3/00* | (2006.01) |
| *H04M 3/16* | (2006.01) |
| *H04M 3/42* | (2006.01) |
| *H04W 4/04* | (2009.01) |
| *G06K 9/00* | (2006.01) |
| *H04W 4/00* | (2009.01) |
| *H04W 48/16* | (2009.01) |
| *H04W 48/18* | (2009.01) |
| *H04W 4/02* | (2009.01) |
| *H04W 8/18* | (2009.01) |
| *H04W 4/14* | (2009.01) |

(52) U.S. Cl.
CPC ............. *H04M 3/16* (2013.01); *G06K 9/00845* (2013.01); *H04M 3/42382* (2013.01); *H04W 4/001* (2013.01); *H04W 4/046* (2013.01); *H04W 48/16* (2013.01); *H04W 48/18* (2013.01); *H04W 4/008* (2013.01); *H04W 4/02* (2013.01); *H04W 4/14* (2013.01); *H04W 8/18* (2013.01)

(58) Field of Classification Search
CPC .. H04W 8/245; H04W 12/02; H04M 1/72519
USPC ........................... 455/418, 550.1, 26.1, 569.2
See application file for complete search history.

(56) References Cited

U.S. PATENT DOCUMENTS

| | | |
|---|---|---|
| 7,548,886 B2 | 6/2009 | Kirkland et al. |
| 7,561,535 B2 | 7/2009 | Naqvi et al. |
| 7,672,297 B2 | 3/2010 | Naqvi et al. |
| 7,724,753 B2 | 5/2010 | Naqvi et al. |
| 7,792,528 B2 | 9/2010 | Naqvi et al. |
| 7,802,292 B2 | 9/2010 | Shaw |
| 7,856,226 B2 | 12/2010 | Wong et al. |
| 7,864,936 B2 | 1/2011 | Naqvi et al. |
| 8,170,534 B2 | 5/2012 | Naqvi et al. |

(Continued)

FOREIGN PATENT DOCUMENTS

| | | |
|---|---|---|
| EP | 1372309 | 12/2003 |
| WO | 2007/002604 | 1/2007 |

*Primary Examiner* — Danh Le

(74) *Attorney, Agent, or Firm* — Stuart H. Mayer; Mayer & Williams PC

(57) ABSTRACT

A system includes a database of image data associated with a vehicle; and control logic configured to cause a user device to capture one or more images and compare data associated with the one or more images with the image data to determine if a user is present in a vehicle and disable a text messaging function at least in part responsive to the determination using the image data.

20 Claims, 10 Drawing Sheets

(56) References Cited

U.S. PATENT DOCUMENTS

| | | |
|---|---|---|
| 8,432,899 B2 | 4/2013 | Naqvi |
| 8,433,303 B2 | 4/2013 | Naqvi et al. |
| 8,483,373 B2 | 7/2013 | Naqvi et al. |
| 8,553,866 B2 | 10/2013 | Naqvi et al. |
| 8,611,334 B2 | 12/2013 | Naqvi |
| 8,666,894 B1 | 3/2014 | Buch et al. |
| 8,730,945 B2 | 5/2014 | Naqvi |
| 2002/0130176 A1 | 9/2002 | Suzuki |
| 2004/0137925 A1 | 7/2004 | Lowe et al. |
| 2004/0158618 A1 | 8/2004 | Shaw |
| 2005/0102358 A1 | 5/2005 | Gold et al. |
| 2007/0055785 A1 | 3/2007 | Stevens |
| 2007/0281713 A1 | 12/2007 | Mullen |
| 2008/0162346 A1 | 7/2008 | Aaron et al. |
| 2008/0164308 A1 | 7/2008 | Aaron et al. |
| 2009/0222907 A1 | 9/2009 | Guichard |
| 2009/0264131 A1 | 10/2009 | Wu |
| 2010/0057485 A1 | 3/2010 | Luft |
| 2010/0299451 A1 | 11/2010 | Yigang et al. |
| 2011/0077028 A1* | 3/2011 | Wilkes et al. ............... 455/456.3 |
| 2011/0257973 A1* | 10/2011 | Chutorash et al. ............ 704/235 |
| 2012/0214463 A1* | 8/2012 | Smith et al. .................... 455/418 |
| 2013/0295908 A1* | 11/2013 | Zeinstra et al. ............... 455/418 |

* cited by examiner

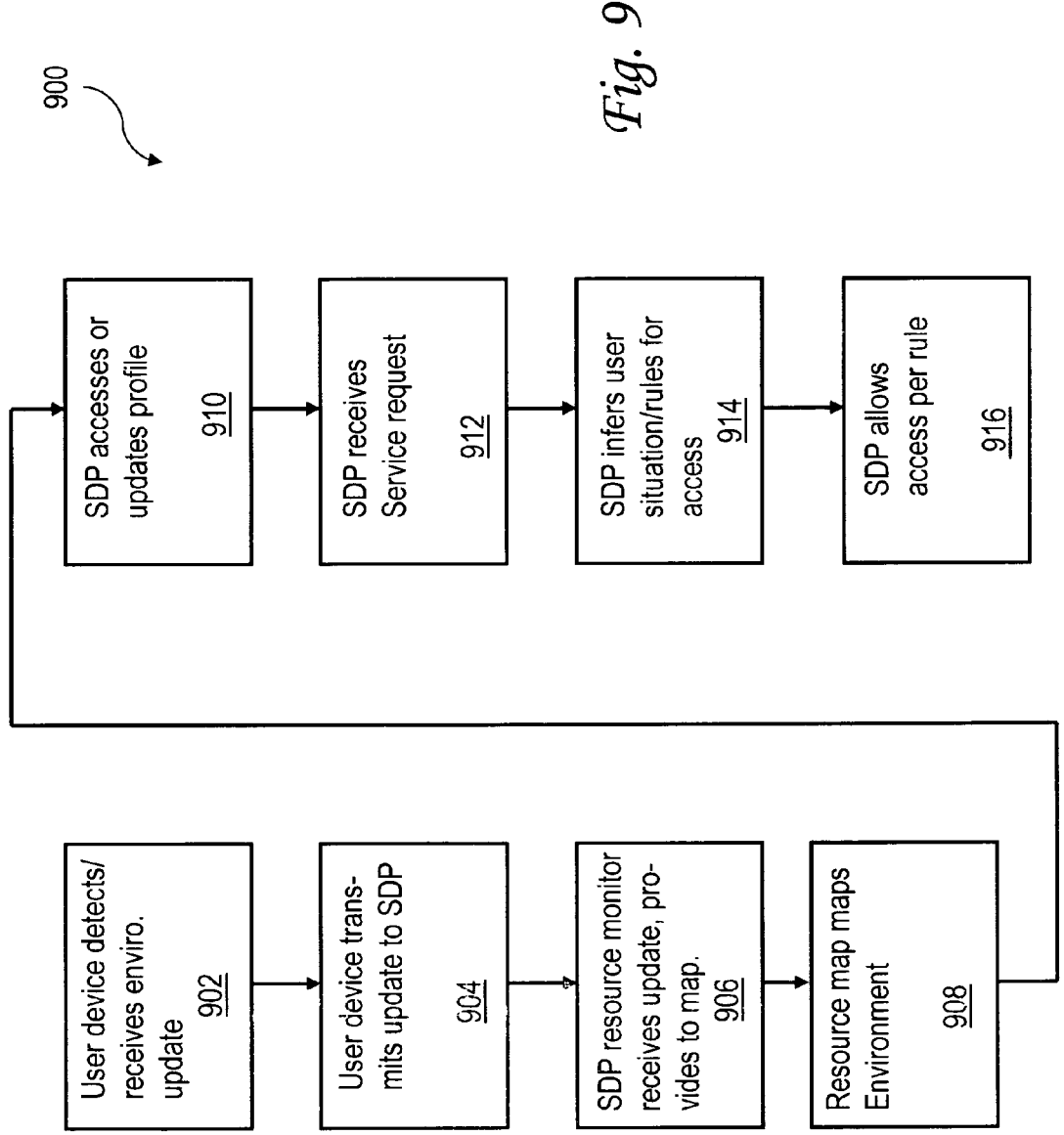

SYSTEM AND METHOD FOR CONTROLLING MOBILE SERVICES USING SENSOR INFORMATION

CROSS-REFERENCE TO RELATED APPLICATIONS

This application is a continuation-in-part of U.S. patent application Ser. No. 12/804,448, filed Jul. 21, 2010, now U.S. Pat. No. 9,210,528 and a continuation-in-part of U.S. patent application Ser. No. 12/931,153, filed Jan. 25, 2011.

BACKGROUND OF THE INVENTION

1. Field of the Invention

The present invention relates to the use of and management of resources for mobile users.

2. Description of the Related Art

Financial services cards, such as debit, credit, and ATM cards, are ubiquitous. Fraud prevention is an increasingly difficult task.

Mobile devices, particularly smart phones and tablets, are seeing phenomenal growth. It is expected by industry analysts that the percentage of consumers who own smart phones soon will outstrip the ownership of the old-fashioned "feature phones." Tablets are increasingly being used for many information tasks by mobile users since their size is decreasing and they are becoming less cumbersome to use in a mobile setting.

Consumers carry mobile devices with them at all times and everywhere. It is a rare consumer who leaves his house without carrying one or more mobile device on his person. Consequently, consumers always have a mobile device handy and often use them in all kinds of situations and environments. Some of these situations may be dangerous to the consumers and/or the general public.

Recently, there have been a flurry of reports in the media highlighting the danger of drivers of automobiles text messaging while driving. Indeed, many fatal accidents have been reported in the press and several legislative bodies have outlawed such use of mobile devices. Drivers of trains and buses have also been charged with such acts of carelessness that have resulted in harm to the general public. The situation is not limited to text messaging but to many other kinds of services available on mobile devices such as games, phone calls, internet browsing, etc. The situation is also not limited to drivers of automobiles but also to operators of buses, public transportation systems, etc.

It is therefore of great public interest to find a general solution that can allow a service provider to detect when a driver or an operator of a transport device is engaged in activity that can potentially lead to a distracted state. Many methods and systems have been proposed to restrict consumers from text messaging while driving.

Certain proposed methods and systems require that the driver's telecommunication signal be jammed within the confines of the automobile. This is clearly unacceptable since it will also render the passenger mobile devices to become inoperative.

Certain other proposed methods rely on detecting when a mobile device (being carried on the person of a consumer) is in motion and rendering it incapable of text messaging (or other services). Again, this would be unacceptable if the device does not belong to the driver of the automobile.

It is therefore imperative to detect when the driver or operator of a car or any transport device is actually engaged in driving the car or transport device. Once such detection has been made, only the device in question should be isolated for any action that the policy of the service provider dictates

SUMMARY OF THE INVENTION

These and other drawbacks in the prior art are overcome in large part by a system and method according to embodiments of the present invention.

A system according to embodiments includes a database of image data associated with a vehicle; and control logic configured to cause a user device to capture one or more images and compare data associated with the one or more images with the image data to determine if a user is present in a vehicle and disable a text messaging function at least in part responsive to the determination using the image data. In some embodiments, the user device includes at least one of a forward facing or rear facing camera. Depending on the embodiment, at least part of the database and control logic may be associated with either the user device or one or more remote servers.

A method in accordance with embodiments includes activating at least one image capturing device associated with a user device and capturing one or more images responsive to one or more predetermined conditions of the user device; at least in part from the one or more images, determining if the user device is located within a vehicle; and disabling a texting function of the user device at least in part if the user device is determined to be located within a vehicle.

In some embodiments, the at least one image capturing device comprises a rear facing cellular telephone camera. In others, the at least one image capturing device comprises a rear facing cellular telephone camera. The method may further comprise determining a speed of the user device and disabling the texting function responsive to determining if the speed is above a threshold and the user device is located within a vehicle. The method may further comprise transmitting the one or more images to a service provider site the service provider site comparing the one or more images to an image database and transmitting one or more control signals to the user device in response thereto. The method may further comprise providing a warning message to the user device responsive to the comparing one or more images.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 9 is a flowchart illustrating operation of embodiments of the present invention.

DETAILED DESCRIPTION OF EMBODIMENTS OF THE INVENTION

Environment Map System

Figure 1:
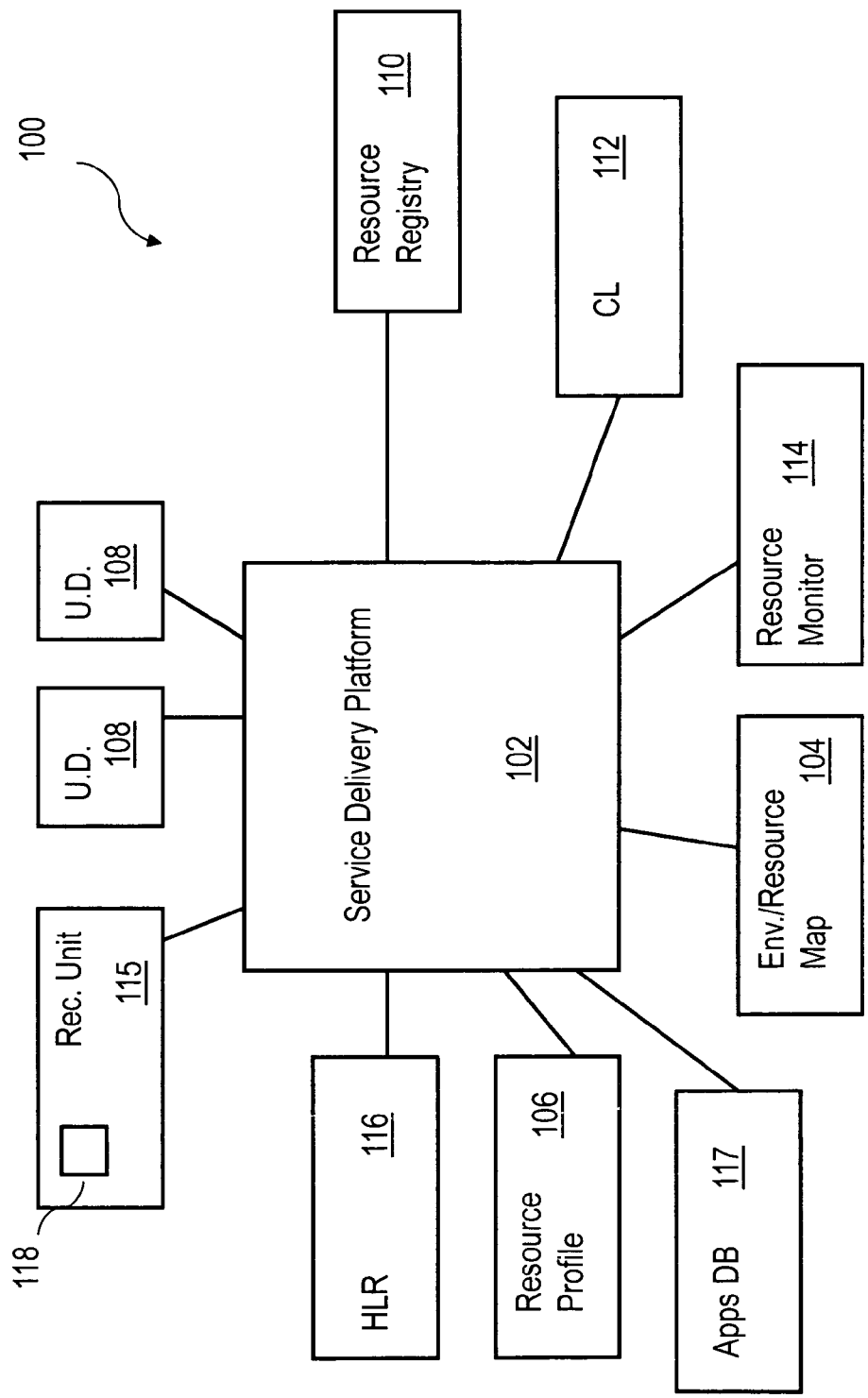
FIG. 1 illustrates an exemplary system according to embodiments of the present invention.

In accordance with embodiments of the present invention, a system and method is provided for using information broadcast by devices and resources in the immediate vicinity of a mobile device, or by sensors located within the mobile device itself, to ascertain and make a determination of the immediate environment and state of the mobile device. This determination may be used to control and manage the actions that the device is asked to carry out by or on behalf of the user. In some embodiments, this can include, for example, denying particular services, such as texting. Alternatively, this determination may be used to provide a user of the mobile device with recommendations, e.g., for apps particularized to the device environment and state.

Advantageously, a carrier can define hundreds of device profiles and automatically and dynamically associate them with user devices, based on the device sensing its environment. The profiles allow or disallow certain actions or combinations of actions, as will be described in greater detail below.

Embodiments of the present invention address locating mobile devices in a telecommunications network that uses a mechanism of "paging requests" by certain network elements and "location updates" by mobile devices to update and maintain a database called the Home Location register (HLR). The term "location" typically refers to the cellular site (cell site) within which the mobile device was last known to be located, although other location methods, including satellite or triangulation-based methods, such as GPS, may be employed.

In accordance with embodiments of the present invention, paging requests and location updates may include not only cell site information, but also the availability of other access networks to the mobile device such as WiFi, Bluetooth, WiMax, etc. Moreover, any other resources, e.g., display devices, that could be used in conjunction with the mobile device that are "attached" to the new access network and which "announce" their capabilities and availability are also included in the updates. Internal sensor information, such as device orientation, motion sensors, etc., may also be provided.

The information so obtained from the environment surrounding a mobile device is captured in a series of update messages, referred to as resource updates, by a network facility that processes and stores the messages.

In an exemplary embodiment, the mobile device contains a registry wherein all applications are authenticated and registered before they can be used in the mobile device. The registry may additionally contain a profile stating what resources an application needs. A network facility uses an application profile and the information obtained from resource updates to dynamically assign a plurality of profiles to the mobile device. A profile may be re-assigned and modified whenever the resource updates or the registry information in the mobile device warrant a change based on service logic executing in the network facility.

Consider, for example, a mobile device that is engaged in a voice telephone call connected to a circuit-switched network. Assume the mobile device contains applications for streaming mobile video and SMS text messaging, the applications registered within the registry of the mobile device. The mobile device will have an associated profile in the network facility that details the resources available to the mobile device, i.e., the circuit-switched network, the mobile video and SMS applications, and any resources needed by the applications.

Now, assume a Bluetooth access network announces itself, its capabilities and its resources. For example, the Bluetooth network may announce its type is "automobile" and that it supports a display device with certain attributes, e.g., resolution, size, etc. Assume the mobile device attaches itself to the new network.

The mobile device will update its registry to include the Bluetooth network and its associated display device. Resource updates from the mobile device to the network facility likewise now list the new access network available to the device (Bluetooth), and any resources that have become available, i.e., the new display device.

This causes the network facility to assign a new profile to the mobile device wherein delivery and display of mobile video may now be effectuated on the newly discovered display device, i.e., the monitor in the automobile. Moreover, a policy restriction stated by the service provider preventing SMS messages from being received and initiated while in an automobile may cause the registry to disable the SMS application, thus preventing the user from launching or receiving SMS messages.

Thus, the user may now view mobile content on the automobile display, rather than on the display of the mobile device, and may not initiate or receive SMS messages while connected to the automobile's Bluetooth network. Alternatively, the service provider may choose to display a warning message to the user without disabling any of the applications in the mobile device.

Similarly, the device internal sensors may identify a particular physical orientation, location or other characteristic of the device, and cause the network facility to enable or disable based thereon. For example, if the device is being held to the ear, then a rule may be provided that video content is on the automobile display rather than the mobile device display. Alternatively, content may be displayed that is related to the sensory information obtained from the device, e.g., a coupon may be displayed indicating an event in close proximity to the current location of the device.

Turning now to the drawings and, with particular attention to FIG. 1, a diagram of a telecommunications system 100 according to an embodiment of the present invention is shown. The telecommunications system 100 may include a network facility, such as a service delivery platform 102, which may include or be in communication with a resource map 104, a resource profile 106, a recognition unit 115, and an apps database 117.

As will be explained in greater detail below, the resource map 104 contains an environment map of resources available to particular users, while the resource profile 106 defines particularized rules for making those resources available. The recognition unit 115, as will be explained in greater detail below, may be implemented as, or including, an inference engine and contains matching rules for comparing access policies to the user device's environment maps. That is, the service delivery platform 102 makes the resources available to the user devices in accordance with the resource map 104, profile 106, and recognition unit 115. In addition, the recognition unit 115 may include an apps recognition unit 118 for recommending particular apps to a user based on the environment or resource maps. That is, the apps recognition unit 118 can process one or more matching rules associated with a mobile device's environment to access particular apps from the apps database 117.

The service delivery platform 102 may include or be in communication with one or more user devices 108, and one or more Home Location Register (HLR) databases 116. Typically, as will be explained in greater detail below, an HLR 116 is provided for each cell site in the network to which the user device is registered. The user devices may further include or be in communication with resource registries 110, capabilities lists (CL) 112, and resource monitors 114.

As will be explained in greater detail below, the resource monitor 114 monitors the network and resource environment (either passively or actively) for devices or resources that have become available or unavailable.

The capabilities lists 112 are lists maintained by all network devices and resources. Specifically, it is envisaged that networks and devices, i.e., all resources, contain an internal capability list (CL) that contains not only the identification number of the resource but also attributes that may be of interest and use to applications. For example, a network CL may show the bandwidth, average latency, etc. A storage device CL may show the amount of available storage, the random access time, etc. A display device CL may show the resolution, number of pixels, etc. Indeed, the attributes in the CL for most popular devices and networks could be standardized. A particular device or entity's CL may be updated when it receives a CL from other resources.

Figure 2:
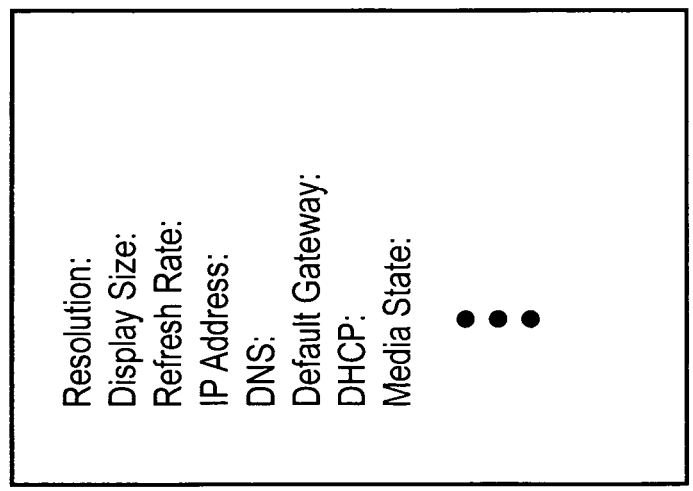
FIG. 2 illustrates a CL according to embodiments of the present invention.

The resource registries 110, on the other hand, are registries maintained by the user device of CLs of other devices that are currently available to it. FIG. 2 illustrates an exemplary CL for a display device that would be maintained in the registry of, say, a mobile telephone. Attributes in the CL describe the capabilities of the resource, its external interfaces, and intrinsic properties. For example, in the case of a display device, this can include resolution, display size, refresh rate, etc.

In certain embodiments, the user devices 108 may be implemented as telephones, cellular telephones, PDAs, computers, hard or soft clients, etc. While typically implemented as a smartphone, the user devices 108 also may be embodied as tablet computers or personal computers implementing a Windows operating system and the Explorer web browser. The user devices 108 thus may include telephony and other multimedia messaging capability using, for example, peripheral cameras, Webcams, microphones, and speakers (not shown) or peripheral telephony handsets.

In general, while the user devices 108 may implement one or more of the systems and methods described herein, the user devices also may implement one or more client devices or programs that communicate with services that implement such systems and methods provided remotely. In certain embodiments, the system 100 may also include other hardware and/or software components (e.g., gateways, proxy servers, registration server, presence servers, redirect servers, databases, applications, etc.).

The devices may also contain sensors for the state of the device and/or the state of its immediate environment, such as temperature, location and orientation. For example, several current mobile devices, such as smartphones, sense WiFi and cellular networks. Others sense the orientation of the device and allow the display to be used in either a portrait or a landscape mode, using a gravity-based pendulum sensor. In addition, proximity sensors turn the display off when the device is held to the ear.

In accordance with embodiments of the present invention, such physical sensors may be used to define not simply local characteristics of the telephone, but may be sent to the registry and uploaded to the network for use in implementing and/or determining network and device access policies. Such information can further be used by the network to determine and recommend suitable content (ads, coupons, etc.) and smartphone apps.

As will be discussed in greater detail below, in order to receive information, a mobile device must be located by the network since it could physically be anywhere in the geographical area Each mobile device periodically generates a message called the location update that is recorded in a Home Location Register (HLR) 116. The location update message typically contains the identity of the cell site in which the mobile device is currently located and some other network-related information, e.g., signal strength, etc.

Whenever the network needs to reach a mobile device, e.g., to initiate an incoming voice call, it sends a paging request to the last cell site in which the mobile device was located. Upon receiving the paging request the mobile device may respond to it. If, however, the mobile device has re-located to another cell site since the last location update, the paging request goes unanswered.

In accordance with embodiments of the present invention, the location update message from a mobile device 108 is further loaded with information about other resources that are currently "available" to the mobile device 108. Specifically, resources "announce" or make available their CLs. This may be achieved either by accepting a specific request on a well-defined interface and responding to the request or by doing a broadcast. The current generation of RFID devices, by way of example, announce themselves through a broadcast mechanism, as do certain WiMax and Wifi networks. The mobile device 108 receives the announcements and aggregates them into one or more resource updates. In some embodiments of the present invention, the announcements include other device CLs. The mobile device 108 periodically broadcasts these resource updates, which are then received by the service delivery platform 102.

As can be appreciated, such updates from the user devices to the service delivery platform 102 via the HLRs 116 could be bandwidth and/or processing intensive. As such, in accordance with embodiments of the present invention, any of a variety of techniques may be used to minimize such effects. For example, less-bandwidth-intensive binary encoding may be used for the uplink registry messages. Alternatively, or additionally, rather than having the uplink occur every time the HLR is updated, it may occur only every other time, or every tenth time, or any other predetermined period. Also, rather than having periodic updates, in some embodiments, the registry upload may occur only if the registry itself has actually been updated.

Furthermore, the service delivery platform 102, in conjunction with the recognition unit 115, the resource map 104 and resource profile 106, may implement one or more databases (not shown) that will require speedy and frequent updates. Accordingly, embodiments of the present invention may make use of "active" databases to accommodate the heavy traffic.

Figure 3:
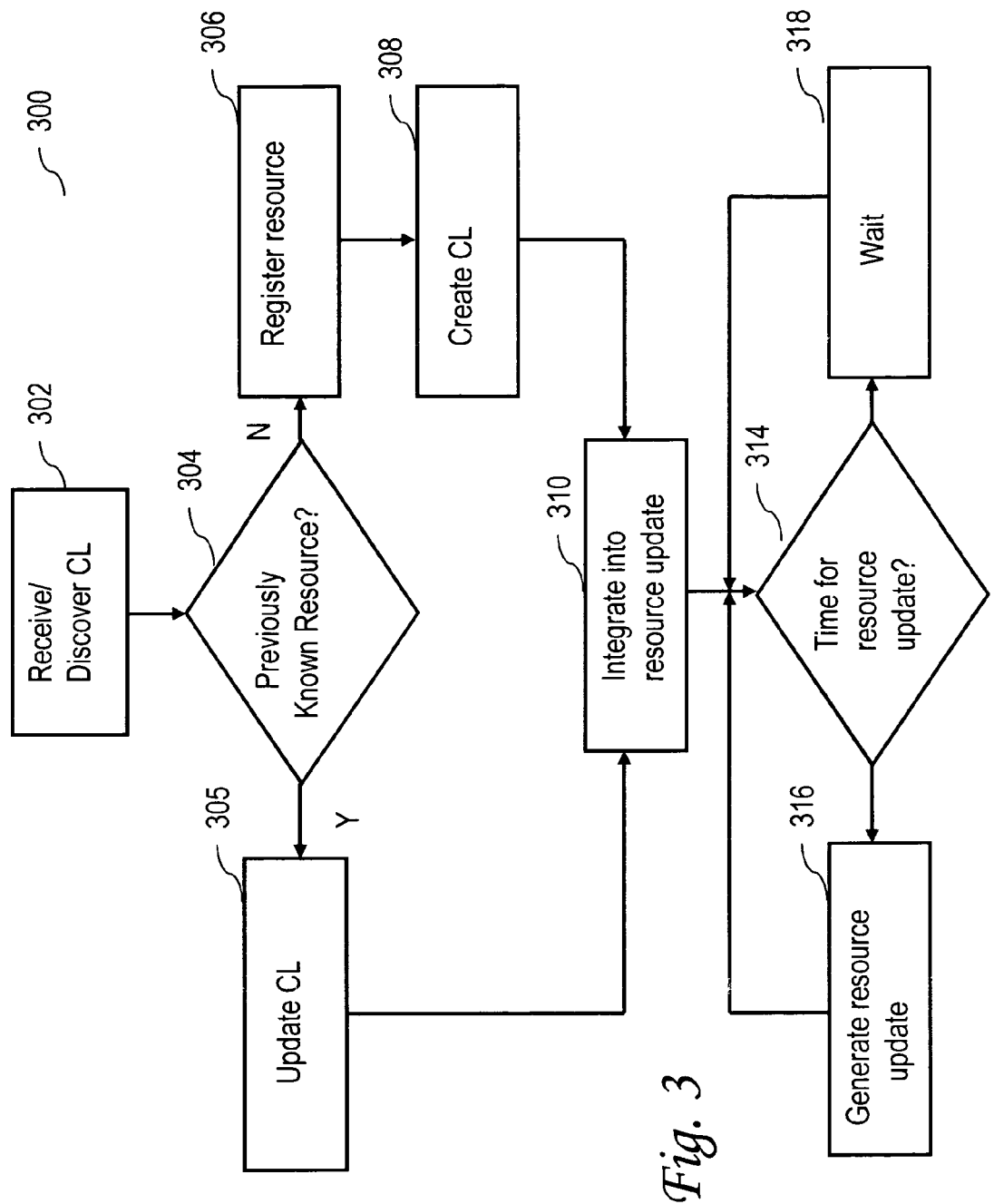
FIG. 3 is a flowchart illustrating operation of embodiments of the present invention.

Turning now to FIG. 3, a flowchart 300 illustrating operation of embodiment of the present invention is shown. The particular arrangement of elements in the flowchart 300 is not meant to imply a fixed order to the elements; embodiments can be practiced in any order that is practicable. More particularly, the flowchart 300 illustrates the aggregation process in a mobile device for a plurality of CLs In a process step 302, the mobile device 108 receives or discovers a CL. Receipt or discovery may be an out-of-band process and may be accomplished through the resource broadcasting or otherwise announcing presence and/or the CL.

In a process step 304, the user device 108 and, particularly, the resource monitor 114, checks if the CL is from a previously known resource. An affirmative response can lead to updating of the CL in the user device's lists (typically, the received CL may itself be updated and thus different from that previously stored), in a process step 306. Once updated, the information is integrated into the next resource update to the service delivery platform 102, as shown at process step 312. More particularly, the information is loaded with the location information to the Home Location Register 116, which provides it to the service delivery platform 102. As noted above, this may be sent with every HLR update, or on an event basis or some periodic basis, and/or using a low bandwidth binary encoding.

If, in process step 304, the CL was determined to be unknown, the resource will be registered in the mobile device registry 110, in a process step 308. A new CL is created for the new resource from the received CL in a process step 310, and the new CL is integrated into a resource update, in a process step 312. Once a resource update is ready, the update is sent to another process 1000 that perpetually loops on a timer at process step 314, and periodically generates a resource update, at steps 316, 318.

As noted above, resource updates from mobile devices are received and stored by the Service Delivery Platform (SDP) 102. Using information from the resource updates, the SDP 102 constructs a conceptual map 104 of the immediate environment of a mobile device, generates a resource profile 106 of a current environment of the device, and uses the recognition unit 115 to allow or disallow functionality based on the map.

Figure 4:
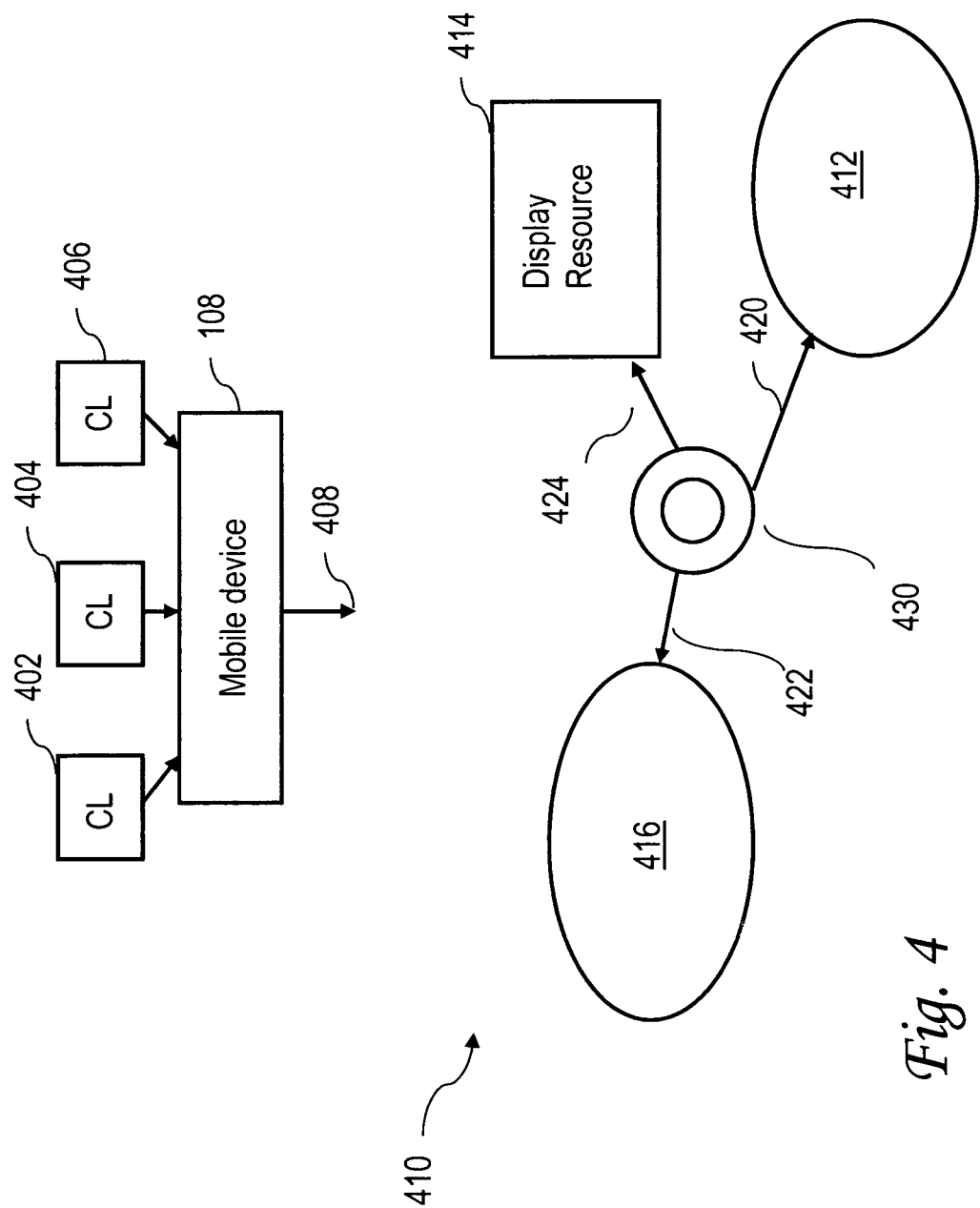
FIG. 4 is a diagram of an exemplary system map according to embodiments of the present invention.

For example, shown in FIG. 4 is a user device 108 that has received CLs from other resources 402, 404, 406. The CLs 402, 406, 408 may be, for example, a cell site, a display resource, and a network resource. The mobile device 108 integrates these CLs into a resource update 408 which in turn is broadcast by the mobile device 108 and received and stored by the SDP 102.

The stored representation of the environment is shown at 410 and may include a cell site 412, a display resource 414 and a network resource 416. The resources 412, 414, 416 correspond to the CLs 402, 404, 406, respectively. It is noted that the graphical representation of FIG. 4 is for purposes of simplicity only; the typical environment map uses internal digital computer data structures to effectively store objects such as CL 402, 404, 406.

In the example illustrated, the informational attributes of CL 402 may describe a cell site of a cellular network 412 with interface 420; the informational attributes of CL 404 may describe a RFID display device depicted as 414 with interface 424; and the informational attributes of CL 406 may describe a WiFi network depicted as 416 with interface 422. The mobile device itself is shown as a unitary structure 430 for purposes of this depiction but will be discussed later.

Thus, with reference to FIG. 4, the environment map 104 of the mobile device 108 shows that the device is in association with a display device 414 using interface 424, and has access to two networks 412 and 416 using interfaces 420, 422 respectively, the former being a WiFi network and the latter a cellular network.

The inventions discussed herein do not presuppose that a resource is necessarily associated exclusively with a single mobile device. Resources may be shared between multiples of mobile devices. It is also envisaged that the SDP 102 maintains an environment map for a plurality of mobile devices and, typically, maintains one map for all mobile devices in its purview.

Figure 5:
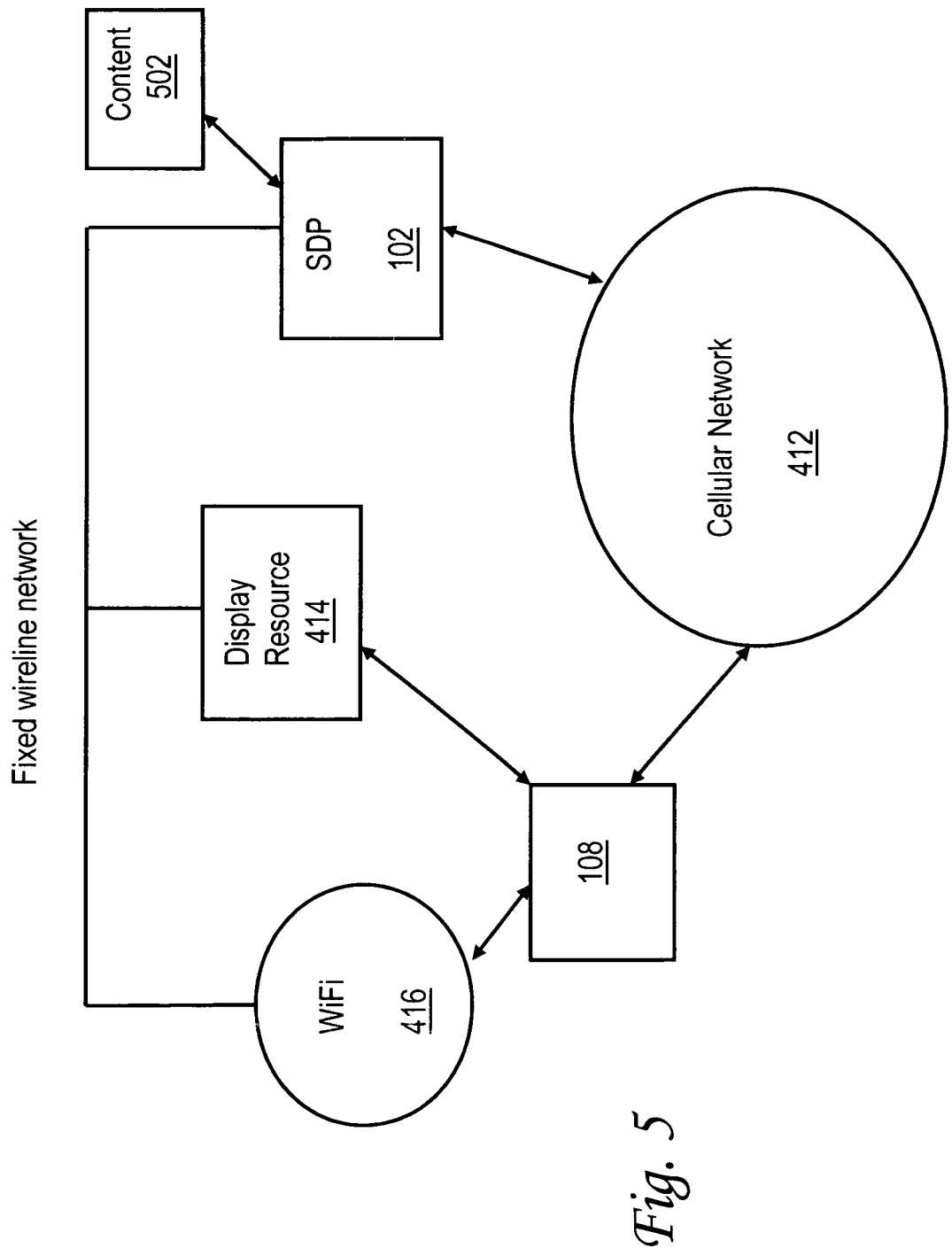
FIG. 5 is a diagram of an exemplary system map according to embodiments of the present invention.

As noted above, the environment map of mobile devices may be used to efficiently deliver to and receive information from the mobile devices. As an exemplary case, consider the problem of delivering video content from a source to the mobile device whose map 104 is depicted in FIG. 5.

The mobile device 108 is associated with a display resource 414, a cellular network 412 and a WiFi network 416. Also shown are a variety of network paths, 101, 201, 301, 501, 601, 701. Given the environment map of mobile device 108, a service profile 106 (FIG. 1) may be associated with the device that specifies that video content from a content server 502 may be delivered to either the mobile device 108 or to the display resource 414 and may further define the network path for the delivery.

In particular, the SDP 102 may choose a network path 101, 201, 301 to deliver the video content to the display resource 424. Alternatively, it may deliver the video content using the network path 101, 201, 501, 601, 301 to the mobile device 108; or it may also use the network path 701, 412. The service profile may further direct the mobile device 108 to consume the video content or to "relay" content to the display resource 424. Such a directive may be dictated by policies stated by the service provider. The SDP 102 may contain service logic using cost functions to choose any one of these paths. It may also use current network traffic and policies to prefer one path over the other possible paths.

If the SDP 102 chooses to deliver the video content to the display resource 424 and not the mobile device 108, it may first seek permission from the mobile device 100 by engaging in user dialog, such as via a graphical user interface. It is thus apparent that a user of a mobile device 108 may request video content from a server and in some cases, as depicted in FIG. 5, the video content will be received and relayed by the mobile device 108, to be displayed on a device 424 in close proximity to the mobile device.

Continuing with the example shown in FIG. 5, if the environment map of the mobile device 108 depicts that the device is in association with, for example, a Bluetooth (WiFi) network 416 generated by an automobile, the system and method of the present invention may employ a recognition unit 114 to examine the environment map 104 of a mobile device 108 to recognize that the mobile device 108 is in a pre-defined context, e.g., in an automobile and may limit access to features and services in response.

Figure 6:
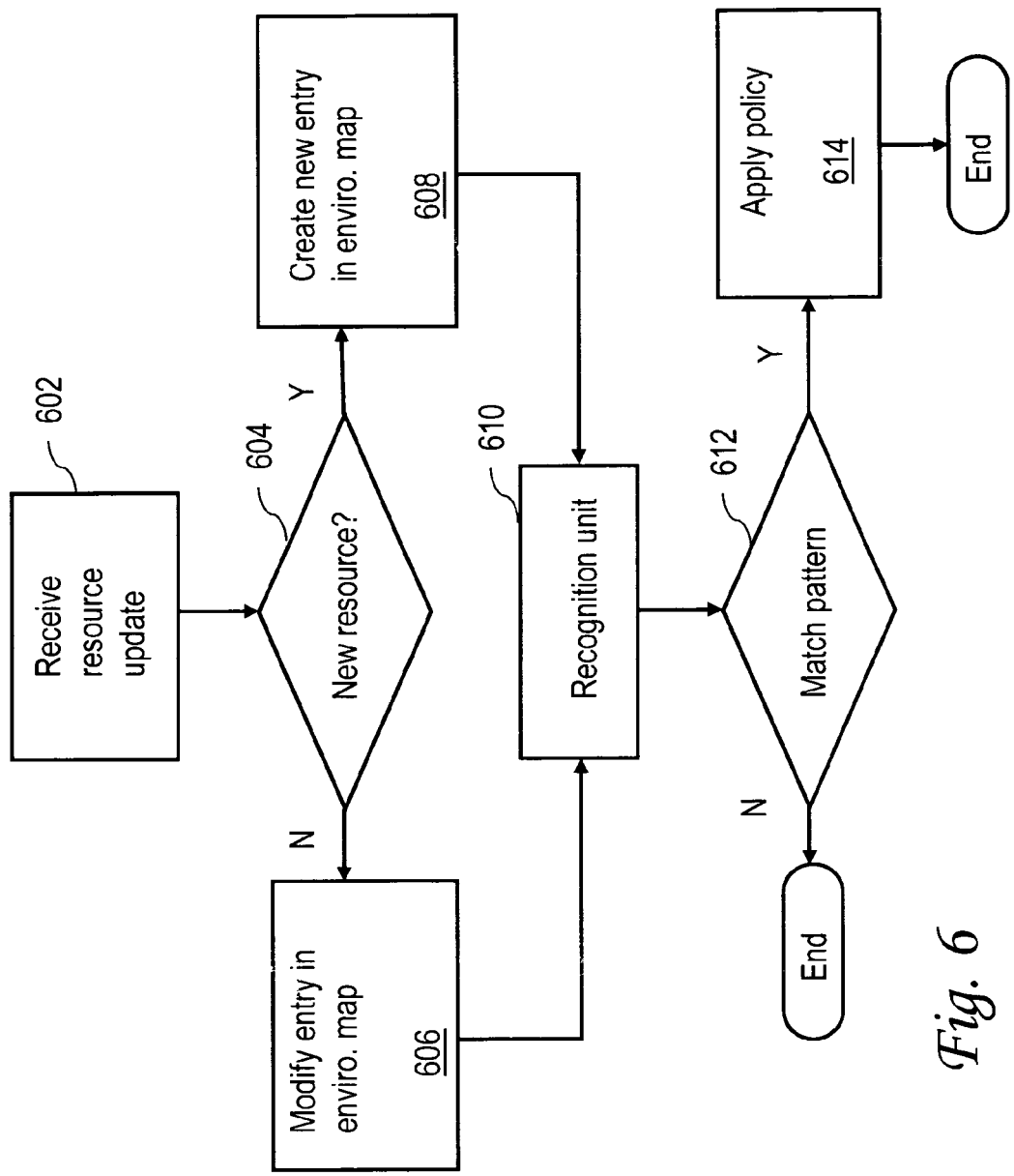
FIG. 6 is a flowchart illustrating operation of embodiments of the present invention.

This is explained further with reference to FIG. 6. The SDP 102 receives resource updates in step 602, and determines whether a resource update is for a new or a previously known mobile device (step 604). Steps 606 and 608 incorporate the received resource update into the environment map 104. In step 610, a recognition unit 115 containing pre-defined pattern matching rules is invoked that examines the environment map 104 for the mobile device 108 with the recently received resource update to determine if the map matches any of the pattern-rules of the recognition unit 115.

If a match is found, i.e., the mobile device 108 is determined to be in a pre-defined network or context or environment, e.g., connected to an automobile wifi network 416, then the recognition unit 115 returns an affirmative response and may apply a service provider policy to the environment of the mobile device, e.g., restrict SMS usage.

In another exemplary embodiment, the SDP 102 may dictate the network path chosen to deliver the video content to the display resource 424 and not to the mobile device 108. The policy enforced by the SDP 102 on behalf of the service provider may be the result of safety considerations calculated by the service provider. Thus, the user of a mobile device 108 in an automobile may view video content on the external display provided by the automobile.

Continuing further with the example depicted in FIG. 5, suppose the mobile device 108 is to be used to transmit content to the network, i.e., in the uplink direction. Again, it is apparent, that the mobile device 108 may query the environment map 104 via the SDP 102 to select a suitable network interface to use for making the transmission.

The present embodiment envisages that computing, display, storage and network resources may be abundantly available to a mobile consumer, and the consumer may choose to use such resources through the system and method described in the present invention. Moreover, as the consumer travels, his environment and availability of resources changes, the changes being recorded in the registries and environment map corresponding to the user's mobile device.

The description of the present embodiment, so far, has concentrated on the external resources available to a mobile device 108, and not on the applications available within the device itself. It is envisaged, as previously stated, that mobile devices contain a registry of all applications that have been loaded on to a mobile device by the service provider or by the user himself. Applications that are not registered in the registry are considered as "rogue" applications and are outside the scope of the present invention.

As described earlier, the environment map for a mobile device depicts the immediate environment of the mobile device and the SDP 102 assigns a network profile 106 to the mobile device based on the current environment map 104. It is envisaged by the present invention that the SDP 102 is also aware of the applications within the registry of the mobile device 108, and when assigning a service profile, may enforce one or more policies on the profile that cause the enablement or disablement of certain applications in the mobile device or impact delivery of information to the mobile device by other network elements.

Continuing with the example of FIG. 5, the exemplary depiction shows mobile device 108 in association with a WiFi network resource 416 generated by an automobile. This association may be assumed to trigger a policy that disables the web browser and the SMS applications in the registry of the mobile device 108. Thus, the user of the mobile device 108 will not be capable of launching the SMS or the web browser applications from the mobile device. Furthermore, the service provider may trigger network elements to disable the delivery of messages to the mobile device in question, e.g., by marking the status of the mobile device as "unavailable" in the HLR will temporarily stop delivery of messages, including SMS messages, to the mobile device.

Turning now to FIG. 9, a flowchart 900 illustrating operation of embodiment of the present invention is shown. The particular arrangement of elements in the flowchart 900 is not meant to imply a fixed order to the elements; embodiments can be practiced in any order that is practicable.

In a process step 902, a user device 108 receives or detects the addition of one or more new programs, resources, or processes that may be available to it. The new additions can include new CLs 112 and result in an updated resource registry 110, as discussed above. In a process step 904, the user device transmits the update to the SDP 102. As discussed above, this can include the user device 108 transmitting a location signal to the Home Location Register and piggybacking the CL and registry information on top. The HLR 116 in turn provides the information to the SDP 102.

In a process step 906, the SDP 102's resource monitor 114 receives the update and provides the information to the resource map 104. In response, in a process step 908, the resource map 104 determines a new environment map for the user device (and other devices). In a process step 910, the SDP 102's recognition unit 115 accesses or updates the resource profile 106 of the particular device whose update has been received. As noted above, the profile includes one or more rules based on inferences from user contexts resulting from knowledge of the user position, device orientation, etc.

In a process step 912, the SDP 102 can receive a service request from a user device. For example, as discussed above, this can include requests for video content or the like. In a process step 914, in response, the SDP 102's recognition unit 115 determines a user situation or device, i.e., accesses and applies the rules or policy for user access to the program or application or resource. Finally, in a process step 916, the SDP 102 can allow access per the rules.

As discussed above, information may be broadcast or transmitted from sensors and resources within or in close proximity of a mobile device. Such information may be received and stored in a repository and made available to other computational methods and processes. The information transmitted by a mobile device further may be processed to determine if the mobile device is in motion at a certain time and in a certain direction. Thus, its velocity, acceleration and location can be determined.

As noted above, in some embodiments, the SDP 102 can allow or disallow texting or other forms of communication while a user is determined to be driving. In particular, embodiments may be aimed at resolving the issue of determining when the user or owner of a mobile device is engaged in an information task using the device, such as texting, and is simultaneously operating an automobile or other transport device, thus being susceptible to distracted driving or distracted operation of a transport device.

In some embodiments, a system defines one or more situational profiles based on sensory data received from a mobile device. The system then analyzes the received information and makes a determination that the owner of the mobile device is engaged in an information activity that could lead to a distracted driving situation. The system then may execute a series of recommended actions based on policies of the service provider.

More particularly, some embodiments include a database containing sensory information associated with the SDP. Such sensory information can include representations of photographs and images of the dashboard and steering wheel of several makes and models of automobiles, train engines, airplane cockpits, etc. In general, the images pertain to the driving and operating environment found in automobiles, cars, buses, etc. These representations of images may be used to train a series of feature recognition algorithms and computational processes.

That is, the service delivery platform, for example, may receive an incoming series of photographs and images, convert them into suitable representations, and match them to the stored representations in the sensory database. A set of rules may be used to guide the matching process and a probability based success metric may be used to decide if a successful match has been made. This matching process is called feature recognition.

In addition to images of the driving environment, it is also possible to store in the sensory database, representations of the facial features of the owner of the device. It is then possible to apply the feature recognition method to the facial features of the owners of devices.

Thus, embodiments of the present invention include taking a series of photographs using the built-in camera devices in smart phones and tablets, i.e., in mobile devices, of the face of the operator of a car or a transport device and his driving environment at certain well-defined time instants, using the front and rear-facing camera devices. The series of photographs may be transmitted to a server in the network where the feature recognition process can be executed. In certain embodiments, all or part of this computational process may be carried out using the resources available on the mobile device itself. Further, the database itself may be available on the device itself.

The result of the feature recognition problem may be used to alert other computational and telecommunication resources, databases, network entities and/or the mobile device to enable or disable certain functions, issue alarms or trigger other process processes in such resources. Thus, a system in accordance with embodiments of the present invention is configured to monitor a mobile device based on sensory data, initiate a feature recognition method and report, trigger, or recommend certain actions to other network devices, resources and entities.

Figure 10:
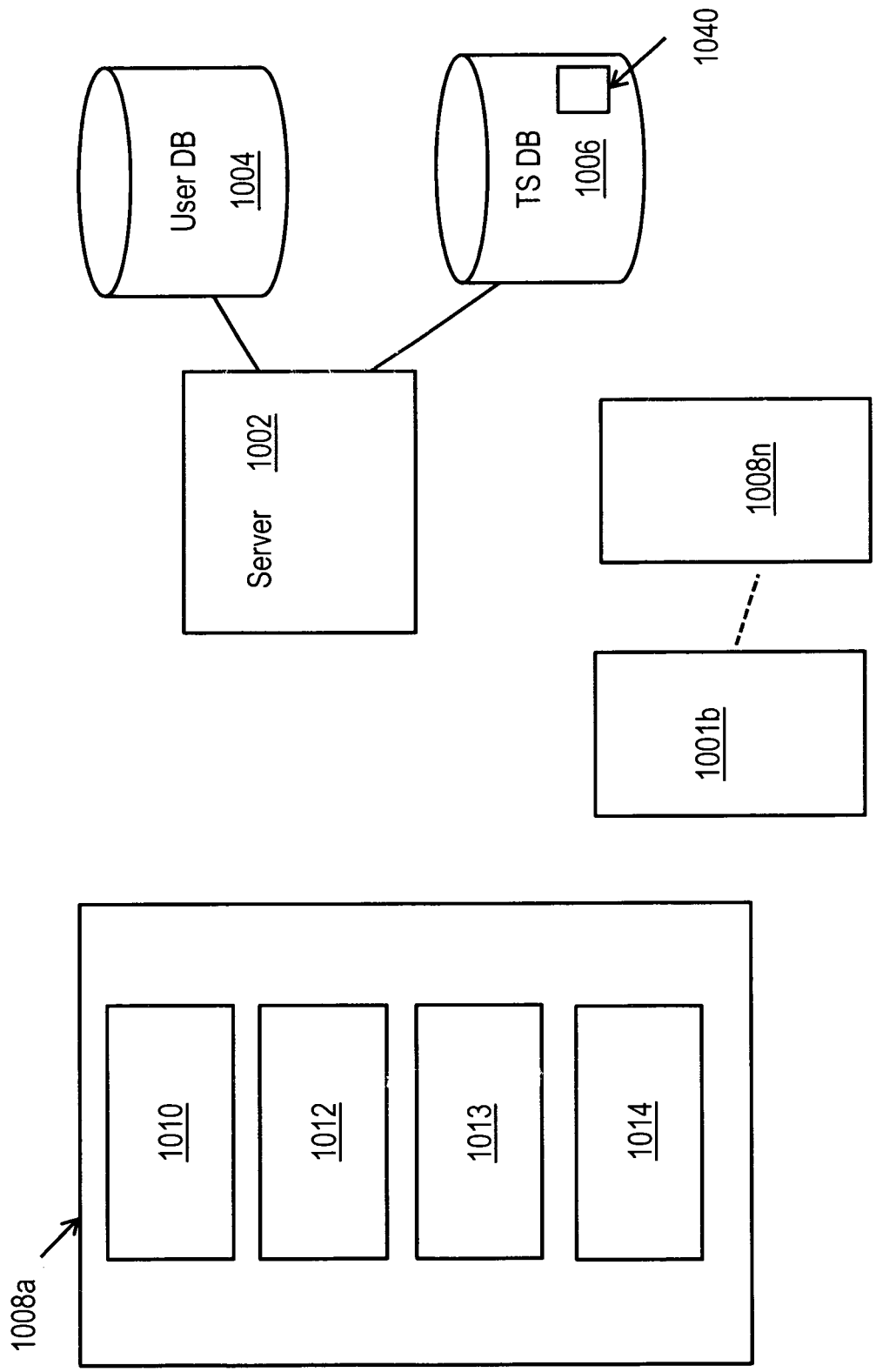
FIG. 10 is a diagram of a system in accordance with embodiments of the present invention.

Turning now to FIG. 10, a diagram illustrating such a system is illustrated in greater detail. It is noted that such a system may be implemented as shown in FIG. 1; FIG. 10 is shown for purposes of clarity.

The system 1000 includes one or more servers 1002 which may be implemented, for example by a service provider and in conjunction with or in collaboration with the service delivery platform 102 (FIG. 1). In some embodiments, the server 1000 may be implemented by a third-party provider. The server 1002 is in communication with or coupled to a user database 1004 and a training sample database 1003. The user database 1004 may store user profiles, capabilities lists, etc., in a manner similar to that discussed above. A plurality of user device 1008, such as smartphones or tablets, may couple to or be in communication with the server 1000 via one or more wireless networks. As discussed above, this can include cellular or 3G networks, the Internet etc.

Briefly, in an out-of-band process, the server 1002 may receive training samples 1040 and store them in the training sample database 1003. This training sample data may include images of various driving environments from various automobiles, buses, cars, trucks, railway engines, etc. In some embodiments, the training sample data is provided to the training sample database 1003 by other servers, service providers, etc. In either case, once stored in the training sample database 1003, these images are made available to the server 1002.

The server 1002 retrieves the various images from the training sample database 1003, creating internal representations of these images and storing these representations in the user data database 1004. The internal representations capture salient aspects of the images and may utilize user input.

Any suitable feature extraction method or algorithm may be used. Once the salient features have been identified and extracted, the resulting representation (consisting of the salient features) is stored in a suitable form in database 1004.

The user device 1008 may include service logic in accordance with embodiments called the user agent (UA) 1010. The logic 1010 may be an app, for example, and may be installed by the consumer himself by loading from an app store or from a pre-defined web site of a service provider. It could also be pre-installed by the device manufacturer. The user agent operates in conjunction with a policy database 1012 and a monitor function 1014, as will be discussed in greater detail below. Briefly, the policy database 1012 stores allowed capabilities and may operate in conjunction with the capabilities lists in a manner similar to that discussed above. The monitor 1014 is triggered to monitor and report the existing environment of the user device.

In operation, the user agent 1010 may be activated to provide environment data about the user device to the server 1002. This can include orientation, speed, etc., information, as discussed above, as well as photographic information obtained from the user device's built-in camera(s) 1013. The resulting image is then compared to the images or image data stored in the database 1004 to ascertain if the user is operating a vehicle. If so, then one or more functions, such as testing, may be turned off or otherwise disabled.

Figure 11:
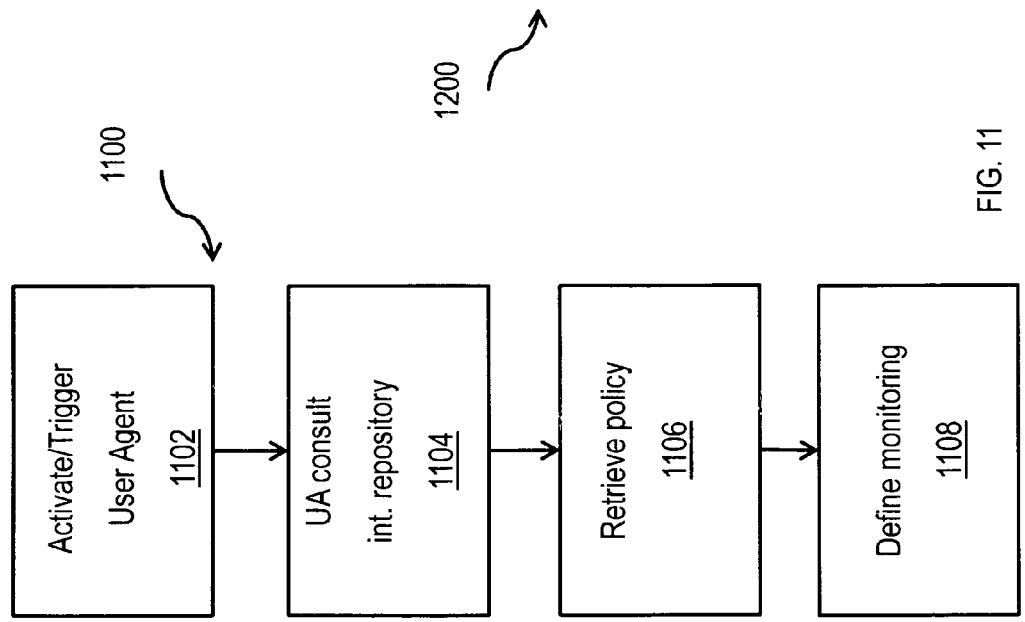
FIG. 11 is a flowchart illustrating operation of embodiments of the present invention.

Turning now to FIG. 11, a flowchart 1100 illustrating operation of embodiment of the present invention is shown. The particular arrangement of elements in the flowchart 300 is not meant to imply a fixed order to the elements; embodiments can be practiced in any order that is practicable.

As shown in FIG. 11, the user agent 1010 may be activated or triggered (step 1102) in any of several ways. It could be triggered by a user action, such as launching an application, e.g., making a phone call or attempting to send or receive a text message. Such actions may influence a registry component of the device's operating system (not shown) that may be programmed to generate a trigger to the user agent 1010. Alternatively, a particular application or service such as text messaging may be programmed to directly generate a trigger for the user agent 1010. Finally, the user may be prompted at device startup time to initiate execution of the user agent 1010.

At step 1104, the user agent 1010 receives the trigger and consults the internal repository database 1012. As discussed above, this can contain policies set by the device manufacturer or the service provider and dictate the frequency and events that need to be monitored. For example, a policy may dictate that text messaging events need to be monitored every time the text messaging application is invoked or whenever a text message is received. Once retrieved (step 1106), the policy is then used to define the current monitoring (step 1108).

Figure 12:
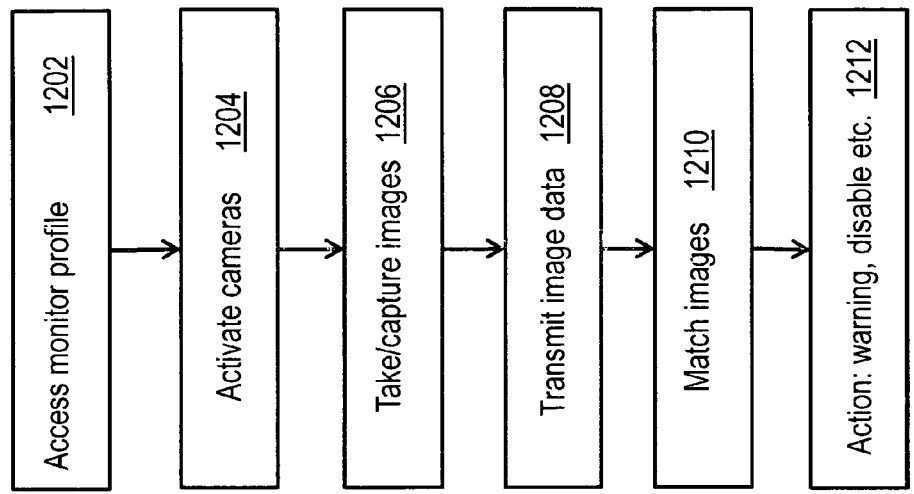
FIG. 12 is a flowchart illustrating operation of embodiments of the present invention.

Turning now to FIG. 12, a flowchart 1200 illustrating operation of embodiment of the present invention is shown. The particular arrangement of elements in the flowchart 1200 is not meant to imply a fixed order to the elements; embodiments can be practiced in any order that is practicable.

In particular, FIG. 12 illustrates operation of a monitor process. In particular, once the user agent is activated and the monitor profile is accessed (step 1202), it in turn causes the activation of the front and rear-facing cameras of the user device (step 1204). Once the front and rear-facing cameras have been activated, a series of images may be taken (step 1206). This series of images may be transmitted to a predetermined and pre-provisioned destination in the network (step 1208). This may include, for example, the SDP 102 of FIG. 1 or, with reference to FIG. 10, this pre-determined destination may the server 1002. Again, however, other destinations run by other parties may be used or, indeed, may be a process internal to the device.

The server 1002 receives the series of images, creates internal representations of the received images, and initiates a process of matching the received image representations with the images stored in the database 1004 (step 1210). This matching process may, in general, be heuristically driven, i.e., the matching process may use hints, rules and probabilistic estimates to arrive at a conclusion of a successful match. For example, the matching process may generate a matching score representing the confidence in a match and a threshold may be defined to accept the matching score as signifying a successful match. That is, a match yielding a matching score exceeding a certain threshold value may be deemed as signifying a successful match. Exemplary image matching techniques are well known.

The match may comprise a match of a photo taken from the device's rear facing camera and may include, say, an image of a dashboard or steering wheel or other indicia indicating that the phone is in use by a driver of a vehicle. For example, in a left-side drive automobile, the image may include a left windshield pylon or a rear-view mirror at the right side of the image. In other embodiments, a front facing camera may capture an image of the face of the driver and background associated with the left rear of the automobile to determine if the driver is in the vehicle behind the wheel.

Once a match has been made successfully, one or more actions may be taken (step 1212). A service provider or a device manufacturer may define the actions that follow from a successful match. A successful match may yield the action of generating a warning message to the user (i.e., audio or text), or disabling the execution of an application for a certain length of time or until a different event triggers a "release." For example, the device may go into a self-checking loop waiting for a certain event (e.g., the motion of the device comes to a stop) before the application is allowed to continue execution.

Figure 7:
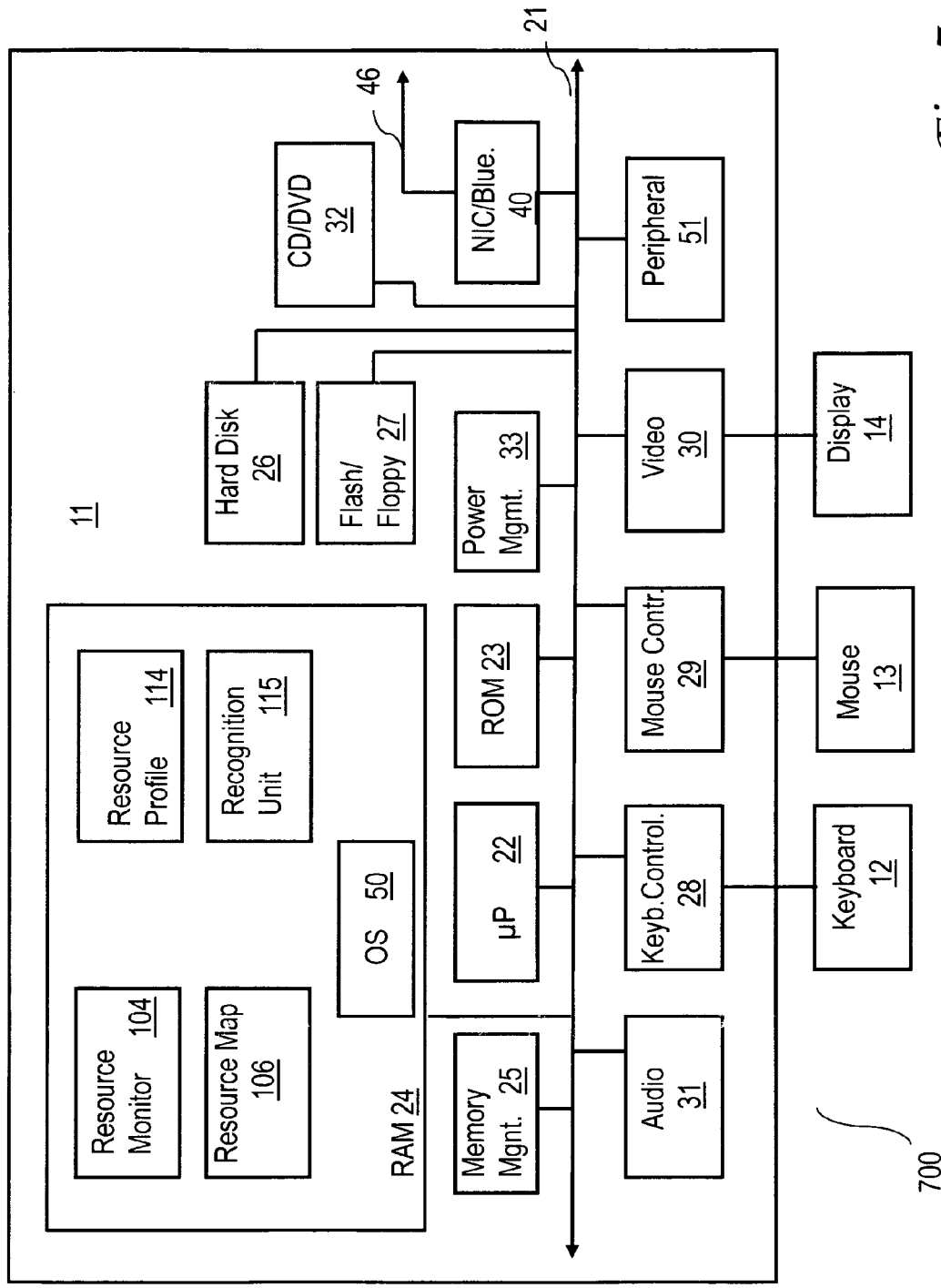
FIG. 7 is an exemplary SDP in accordance with embodiments of the present invention.

FIG. 7 shows a block diagram of components of a service delivery platform, server, or service provider implemented as a computing device 700, e.g., personal, or laptop computer or server. In some embodiments, the computing device 700 may implement one more elements of the methods disclosed herein.

The system unit 11 includes a system bus or a plurality of system buses 21 to which various components are coupled and by which communication between the various components is accomplished. A processor 22, such as a microprocessor, is coupled to the system bus 21 and is supported by the read only memory (ROM) 23 and the random access memory (RAM) 24 also connected to the system bus 21. The computer 700 may be capable of high volume transaction processing, performing a significant number of mathematical calculations in processing communications and database searches. A Pentium™ or other similar microprocessor manufactured by Intel Corporation may be used for the processor 22. Other suitable processors may be available from Freescale Semiconductor, Inc., Advanced Micro Devices, Inc., or Sun Microsystems, Inc. The processor 22 also may be embodied as one or more microprocessors, computers, computer systems, etc.

The ROM 23 contains among other code the basic input output system (BIOS) which controls basic hardware operations such as the interaction of the disk drives and the keyboard. The ROM 23 may be embodied, e.g., as flash ROM. The RAM 24 is the main memory into which the operating system and applications programs are loaded. The memory management chip 25 is connected to the system bus 21 and controls direct memory access operations including passing data between the RAM 24 and hard disk drive 26 and removable drive 27 (e.g., floppy disk or flash ROM "stick"). A CD ROM drive (or DVD or other optical drive) 32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13 (or other cursor pointing device); the video controller 30 is the hardware interface for the video display 14; and the audio controller 31 is the hardware interface for a speaker and microphone (not shown). It is noted that while the various I/O controllers are illustrated as discrete entities, in practice, their functions may be performed by a single I/O controller known as a "super I/O." Thus, the figures are exemplary only.

In operation, keyboard strokes are detected by the keyboard controller 28 and corresponding signals are transmitted to the microprocessor 22; similarly, mouse movements (or cursor pointing device movements) and button clicks are detected by the mouse controller and provided to the microprocessor 22. Typically, the keyboard controller 28 and the mouse controller 29 assert interrupts at the microprocessor 22. In addition, a power management system 33 may be provided which causes the computer to enter a power down mode if no activity is detected over a predetermined period.

One or more network interfaces 40 enable communication over a network 46, such as a packet network like the Internet. The network interfaces 40 may be implemented as wired or wireless network interfaces operating in accordance with, for example, one or more of the IEEE 802.11x standards and may also or alternatively implement a Bluetooth interface.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, a removable drive 27, or the flash ROM.

As shown in the figure, the operating system 50, resource monitor 104, resource map 106, resource profile(s) 114, and recognition unit 115 are resident in the RAM 24. The operating system 50 functions to generate a graphical user interface on the display 14.

Execution of sequences of the instructions in the programs causes the processor 22 to perform various of the process elements described herein. In alternative embodiments, hardwired circuitry may be used in place of, or in combination with, software instructions for implementation of some or all of the methods described herein. Thus, embodiments are not limited to any specific combination of hardware and software.

The processor 22 and the data storage devices 26, 27, 32 in the computer 700 each may be, for example: (i) located entirely within a single computer or other computing device; or (ii) connected to each other by a remote communication medium, such as a serial port cable, telephone line or radio frequency transceiver. In one embodiment, the computer 100 may be implemented as one or more computers that are connected to a remote server computer.

Figure 8:
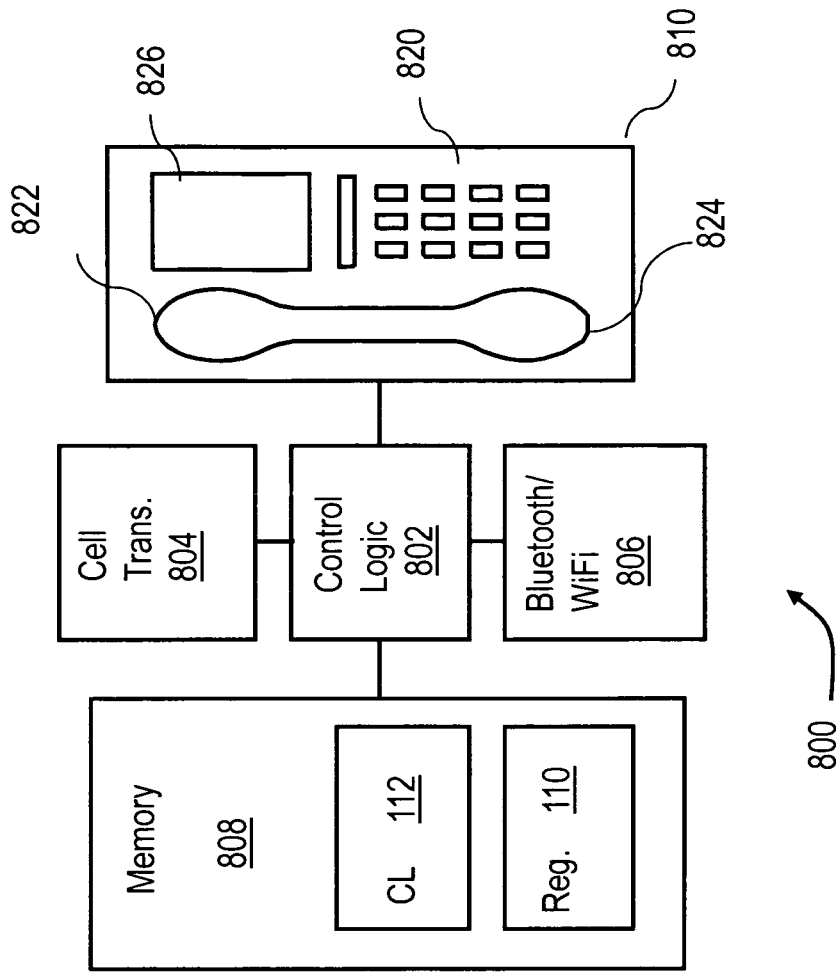
FIG. 8 is an exemplary user device in accordance with embodiments of the present invention.

As noted above, embodiments of the present invention may be implemented in or in conjunction with a telephone, such as a wireless or cellular "smart" telephone. An exemplary cellular telephone 800 including capabilities in accordance with an embodiment of the present invention is shown in FIG. 8. In some embodiments, the cellular telephone 800 may implement one or more elements of the methods disclosed herein. As shown, the cellular telephone includes control logic 802 and cellular transceiver 804. The cellular transceiver 804 allows communication over a cellular telephone network, such as a GSM or GPRS based cellular telephone network. The control logic 802 generally controls operation of the cellular telephone and, in some embodiments, implements CLs and resource registry, as well as other services or clients in accordance with embodiments of the present invention.

The control logic 802 interfaces to a memory 818 for storing, among other things, contact or address lists 107. The control logic 802 also interfaces to a user interface(s) 810. The user interface(s) 810 can include a keypad 820, speaker 822, microphone 824, and display 826. The keypad may include one or more "hard" keys, but may be implemented in whole or in part as a cursor pointing or other device in association with one or more "virtual" keys on the display 826. In general, a user may make use of the keypad 820 and display 826 to enter contact information, and may speak into the microphone to provide the audio input(s). It is noted that other interfaces, such as voice-activated interfaces may be provided. Thus, the figure is exemplary only. In addition, a Bluetooth or WiFi interface 806 may be provided. A memory 808 for storing program code and data, such as the CL 112 and registry 110, also may be provided. Further, the cellular telephone may include one or more built-in cameras 83 for taking and storing photographs.

While specific implementations and hardware/software configurations for the mobile device and SDP have been illustrated, it should be noted that other implementations and hardware configurations are possible and that no specific implementation or hardware/software configuration is needed. Thus, not all of the components illustrated may be needed for the mobile device or SDP implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method of controlling user device services using sensor information comprising:
    providing a user device comprising:
        detecting environment conditions surrounding the user device using an environment sensor and generating and broadcasting periodic and triggered updated information about the environment conditions from the user device;
        detecting conditions of the user device using an internal sensor and generating and broadcasting periodic and triggered updated information about the conditions of the user device from the user device;
        activating at least one image capturing device included as part of the user device and capturing one or more images responsive to one or more detected conditions; and
        creating a registry comprising updated information from the environment sensor and the internal sensor, the one or more captured images, and information about what applications involve texting and are authenticated for the user device along with an application profile stating what resources each application needs and generating and broadcasting the registry both using triggers and periodically;
    providing a network facility in communication with the user device;
    creating an environment map in communication with the user device and the network facility comprising resource profiles comprising the information broadcast from the user device and defining resources as available to the user device and generating and broadcasting periodic and triggered updated resource profiles further comprising information about the available resources in response to receiving the broadcast information;
    storing updated resource profiles in the network facility;
    providing a rules-based inference engine in communication with the environment map and the network facility and defining particularized access policies matching rules for matching by comparing the one or more captured images to stored images of a vehicle driver operating environment and making texting enabled and available if there is no match and making texting disabled and unavailable if there is a match;
    receiving broadcasts of information generated from the user device and the environment map into the network facility and communicating with the inference engine in response to receiving broadcasted information to determine if the received information matches a resource profile, and, if there is a match, deciding whether or not the one or more captured images generated by the user device and the environment map matches a vehicle driver operating environment; and
    modifying the resource profiles if the captured images match a vehicle driver operating environment to define texting as disabled and unavailable to the user device based on the environment conditions indicating that texting is occurring from the vehicle driver operating environment.

2. The method recited in claim 1 wherein the at least one image capturing device comprises a rear facing cellular telephone camera.

3. The method recited in claim 1 wherein the at least one image capturing device comprises a forward facing cellular telephone camera.

4. The method recited in claim 1 further comprising the environment sensor and the internal sensor detecting user device orientation data, user device temperature data, user speed data, user acceleration data, and user location data.

5. The method recited in claim 4 further comprising determining the speed of the user device and disabling the texting function responsive to determining if the speed is above a threshold and the user device is located within a vehicle driver operating environment.

6. The method recited in claim 1 further comprising transmitting the one or more captured images to a service provider site in communication with the network facility, the service provider site comparing the one or more captured images to an image database to decide whether or not the one or more captured images generated by the user device and the environment map match a vehicle driver operating environment, and notifying the network facility of the image matching.

7. The method recited in claim 1 further comprising providing a warning message to the user device responsive to the comparing the one or more captured images.

8. The method of claim 1 further comprising maintaining a database of image data associated with vehicles in communication with the user device.

9. The method of claim 8 further comprising configuring the user device for communicating with the rules-based inference engine and controlling the user device to compare the one or more captured images with the database of image data associated with vehicles.

10. The method of claim 9 further comprising storing the database internally on the user device.

11. The method of claim 9 further comprising storing the database remotely on at least one remote server.

12. The method of claim 9 further comprising controlling the user device to determine if a user is present in a vehicle driver operating environment based on comparing the one or more captured images with the database of image data then disabling the user device text messaging function by writing to the registry in the user device.

13. The method of claim 12 further comprising providing at least one machine readable medium including executable instructions controlling the user device with control logic for determining if a user is present in a vehicle driver operating environment and for disabling the user device text messaging function by writing to the registry in the user device.

14. The method of claim 1 further comprising transmitting one or more commands to the user device using the network facility and controlling the user device with control logic to receiving commands from the network facility that disable texting by updating the registry.

15. A method of enabling and disabling user device services comprising:
    activating at least one image capturing device included as part of the user device and capturing one or more images responsive to one or more predetermined conditions of the user device;
    creating a registry comprising the one or more captured images and information about what applications involve texting and are authenticated for the user device along with an application profile stating what resources each application needs;
    comparing the one or more captured images with representative images of vehicle driver operating environments to determine if a user is in the vehicle driver operating environment; and
    disabling text message capabilities by updating the registry if the one or more captured images match one or more of the representative images of vehicle driver operating environments.

16. The method of claim 15 further comprising determining the speed of the user device and disabling the texting function responsive to determining if the speed is above a threshold and the user device is located within a vehicle driver operating environment.

17. The method of claim 15 further comprising maintaining a database of image data associated with vehicles in communication with the user device, controlling the user device to compare the one or more captured images with the database of image data associated with vehicles wherein the database is stored in one form of internally on the user device and remotely in at least one remote server, controlling the user device to determine if a user is present in a vehicle driver operating environment based on comparing the one or more captured images with the database of image data, and disabling the user device text messaging function by writing to the registry in the user device if a user is present in a vehicle driver operating environment.

18. The method of claim 17 further comprising providing at least one machine readable medium including executable instructions controlling the user device with control logic for determining if a user is present in a vehicle driver operating environment and for disabling the user device text messaging function by writing to the registry in the user device.

19. A method of controlling user device services for a plurality of user devices using sensor information comprising:
    providing a plurality of user devices, each specific user device comprising:
        detecting environment conditions surrounding the specific user device using an environment sensor and generating and broadcasting periodic and triggered updated information about the environment conditions from the specific user device;
        detecting conditions of the specific user device using an internal sensor and generating and broadcasting periodic and triggered updated information about the conditions of the specific user device from the specific user device;
        activating at least one image capturing device included as part of the specific user device and capturing one or more images responsive to one or more detected conditions;
        creating a registry comprising updated information from the environment sensor and the internal sensor, the one or more captured images, and information about what applications involve texting and are authenticated for the specific user device along with an application profile stating what resources each application needs and generating and broadcasting the registry both using triggers and periodically; and
        identifying the specific user device and its specific end user using identification information from the specific user device and generating and broadcasting periodic and triggered updated information about the specific user device and its specific end user;
    providing a network facility in communication with the plurality of user devices;
    creating an environment map in communication with the plurality of user devices and the network facility comprising a plurality of resource profiles comprising the information broadcast from the plurality of user devices and defining resources as available to the plurality of user devices and generating and broadcasting periodic and triggered updated resource profiles further comprising information about the available resources in response to receiving the broadcast information;
    storing the updated plurality of resource profiles in the network facility;
    providing a rules-based inference engine in communication with the environment map and the network facility and defining particularized access policies matching rules for matching by comparing the one or more captured images to stored images of a vehicle driver operating environment and making texting enabled and available if there is no match and making texting disabled and unavailable if there is a match;

receiving broadcasts of information generated from the plurality of user devices and the environment map into the network facility and communicating with the inference engine in response to receiving broadcasted information to determine if the received information matches a resource profile, and, if there is a match, deciding whether or not the one or more captured images generated by the plurality of user devices and the environment map matches a vehicle driver operating environment; and modifying the resource profiles if the captured images match a vehicle driver operating environment to define texting as disabled and unavailable to the user device identified by the broadcast identification information based on the environment conditions indicating that texting is occurring from the vehicle driver operating environment.

20. The method of claim 19 further comprising maintaining a database of image data associated with vehicles in communication with the user device, configuring the user device for communicating with the rules-based inference engine and controlling the user device to compare the one or more captured images with the database of image data associated with vehicles, controlling the user device to determine if a user is present in a vehicle driver operating environment based on comparing the one or more captured images with the database of image data then disabling the user device text messaging function by writing to the registry in the user device.

* * * * *

UNITED STATES PATENT AND TRADEMARK OFFICE
CERTIFICATE OF CORRECTION

| | |
|---|---|
| PATENT NO. | : 9,232,046 B2 |
| APPLICATION NO. | : 13/507077 |
| DATED | : January 5, 2016 |
| INVENTOR(S) | : Shamim A. Naqvi |

It is certified that error appears in the above-identified patent and that said Letters Patent is hereby corrected as shown below:

Title Page item (63) should read:

(63) This application is a Continuation-in-part of application no. 12/804,448, filed July 21, 2010, now U.S. Pat. No. 9,210,528 and a Continuation in part of application no. 12/931,153, filed January 25, 2011.

Signed and Sealed this
Nineteenth Day of April, 2016

Michelle K. Lee
*Director of the United States Patent and Trademark Office*